US009024878B2

(12) United States Patent
Partani et al.

(10) Patent No.: US 9,024,878 B2
(45) Date of Patent: May 5, 2015

(54) HARDWARE CURSOR SNOOPING

(75) Inventors: Dwarka Partani, San Jose, CA (US);
Sujith Arramreddy, San Jose, CA (US);
Wilfred A. Smith, San Jose, CA (US)

(73) Assignee: Emulex Corporation, Costa Mesa, CA (US)

( * ) Notice: Subject to any disclaimer, the term of this patent is extended or adjusted under 35 U.S.C. 154(b) by 1207 days.

(21) Appl. No.: 12/031,056

(22) Filed: Feb. 14, 2008

(65) Prior Publication Data

US 2008/0201644 A1 Aug. 21, 2008

Related U.S. Application Data

(60) Provisional application No. 60/890,405, filed on Feb. 16, 2007, provisional application No. 60/892,534, filed on Mar. 1, 2007.

(51) Int. Cl.
G09G 5/00 (2006.01)
G06F 3/033 (2013.01)
G06F 3/038 (2013.01)

(52) U.S. Cl.
CPC ........ G06F 3/038 (2013.01); *G06F 2203/0383* (2013.01)

(58) Field of Classification Search
USPC .......................................... 345/157; 715/740
See application file for complete search history.

(56) References Cited

U.S. PATENT DOCUMENTS

| 5,812,820 | A | 9/1998 | Loram |
| 6,054,823 | A | 4/2000 | Collings et al. |
| 6,157,989 | A | 12/2000 | Collins et al. |
| 6,378,009 | B1 | 4/2002 | Pinkston, II et al. |
| 6,378,014 | B1 | 4/2002 | Shirley |
| 6,388,658 | B1 | 5/2002 | Ahern et al. |
| 6,476,854 | B1 * | 11/2002 | Emerson et al. ............... 348/143 |
| 6,567,869 | B2 | 5/2003 | Shirley |
| 6,671,756 | B1 | 12/2003 | Thomas et al. |
| 6,672,896 | B1 | 1/2004 | Li |
| 6,681,250 | B1 | 1/2004 | Thomas et al. |
| 6,710,790 | B1 * | 3/2004 | Fagioli ......................... 715/802 |
| 6,915,362 | B2 | 7/2005 | Ramsey et al. |

(Continued)

OTHER PUBLICATIONS

Hewlett-Packard Development Company, LP; "Integrated Lights-Out Virtual Serial Port Configuration and Operation". HOWTO, 2nd edition, 2005, 20 pages. Hewlett-Packard Development Company, LP.

(Continued)

*Primary Examiner* — Amare Mengistu
*Assistant Examiner* — Sarvesh J Nadkarni
(74) *Attorney, Agent, or Firm* — Alford Law Group, Inc.; Shant Tchakerian

(57) ABSTRACT

A feedback subsystem may be used to control the positioning of a local cursor of a display in response to receiving remote cursor movement information from a remote computer system. The feedback subsystem may send the remote cursor movement information to an operating system (OS) which may send local coordinate information to a graphics controller. Local coordinate information from the graphics controller may be used to compare with remote coordinate information received from the remote computer system. The feedback subsystem may repeatedly send the remote cursor movement information to the OS until it is determined that the local coordinate information from the graphics controller is consistent with the remote coordinate information received from the remote computer system.

20 Claims, 6 Drawing Sheets

(56) References Cited

U.S. PATENT DOCUMENTS

| | | |
|---|---|---|
| 6,931,475 B2 | 8/2005 | Huang et al. |
| 6,961,798 B2 | 11/2005 | Ferguson |
| 7,228,345 B2 | 6/2007 | Larson et al. |
| 7,403,204 B2 | 7/2008 | Emerson et al. |
| 7,424,419 B1 | 9/2008 | Fike et al. |
| 7,447,995 B2 * | 11/2008 | Luciani et al. ............... 715/740 |
| 7,502,878 B1 | 3/2009 | Wright |
| 7,519,747 B1 | 4/2009 | Cory et al. |
| 7,519,749 B1 | 4/2009 | Sivertsen |
| 7,817,157 B2 | 10/2010 | Emerson et al. |
| 7,827,258 B1 * | 11/2010 | Kalbarga .................... 709/223 |
| 7,861,171 B2 * | 12/2010 | Johanson et al. ............ 715/733 |
| 2003/0084133 A1 | 5/2003 | Chan et al. |
| 2003/0217123 A1 * | 11/2003 | Anderson et al. ............ 709/219 |
| 2005/0007344 A1 * | 1/2005 | Cook et al. .................. 345/163 |
| 2006/0164406 A1 | 7/2006 | Emerson et al. |
| 2006/0168099 A1 | 7/2006 | Diamant |
| 2006/0248360 A1 | 11/2006 | Fung |
| 2007/0085825 A1 * | 4/2007 | Geffin et al. ................. 345/157 |
| 2007/0101173 A1 | 5/2007 | Fung |

OTHER PUBLICATIONS

"Remote access eliminates 'house calls'" 2004. Communications News. 2 pages. http://www.comnews.com/stories/articles/1104/1104remote_access.htm.

Shilmover, B. "Hardware Management in Microsoft Windows Server 2003 R2 RC0" Part 1 and 3. 2007 Microsoft Corporation. 17 pages.

Zhuo, H.; Yin, J.; Rao, A. "Remote Management with the Baseboard Management Controller in Eighth-Generation Dell PowerEdge Servers" Dell Power Solutions. 2004. p. 26-29.

* cited by examiner

US 9,024,878 B2

HARDWARE CURSOR SNOOPING

CROSS-REFERENCE TO RELATED APPLICATIONS

This United States (U.S.) patent application claims the benefit of U.S. provisional patent application No. 60/890,405 entitled INTEGRATED MANAGEMENT, GRAPHICS AND I/O CONTROL FOR SERVER SYSTEMS filed on Feb. 16, 2007 by inventors Dwarka Partani et al. and the benefit of U.S. provisional patent application No. 60/892,534 entitled HARDWARE CURSOR SNOOPING filed on Mar. 1, 2007 by inventors Dwarka Partani et al.

FIELD OF THE INVENTION

The present invention relates generally to field of server management. More specifically, the present invention relates to methods and apparatus for synchronizing cursor positions on multiple displays.

BACKGROUND

In computing environments where computer systems and users of the computer systems are located in different geographical areas, it is imperative to have a supporting network capable of enabling the users to use the computer systems as if the users and the computer systems are located in the same geographical area. These computing environments may be advantageous because they allow companies to use resources in areas of the world that may be more cost effective. One challenge to supporting these environments is managing communication between computer systems such that there is minimal perceived delay or inaccuracy caused by the geographical differences.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Introduction

For some embodiments, methods and systems for remotely controlling a position of a cursor of a local display is disclosed. Cursor movement information may be sent from a remote computer system. The cursor movement information may be processed by an operating system (OS) of a local computer system. The OS may position the cursor at a first coordinate of the display. Feedback logic or subsystem may be used to determine if the first coordinate is similar to an intended coordinate. The feedback logic may send information to the OS to enable repositioning of the cursor to the intended coordinate.

The remote control of a position of a cursor may be used between a remote computer and a local server system to provide server management thereof. The following sections introduce embodiments in which the remote cursor snooping and remote control of a position of a cursor may be applied.

Server Farm with Server Management

Figure 1:
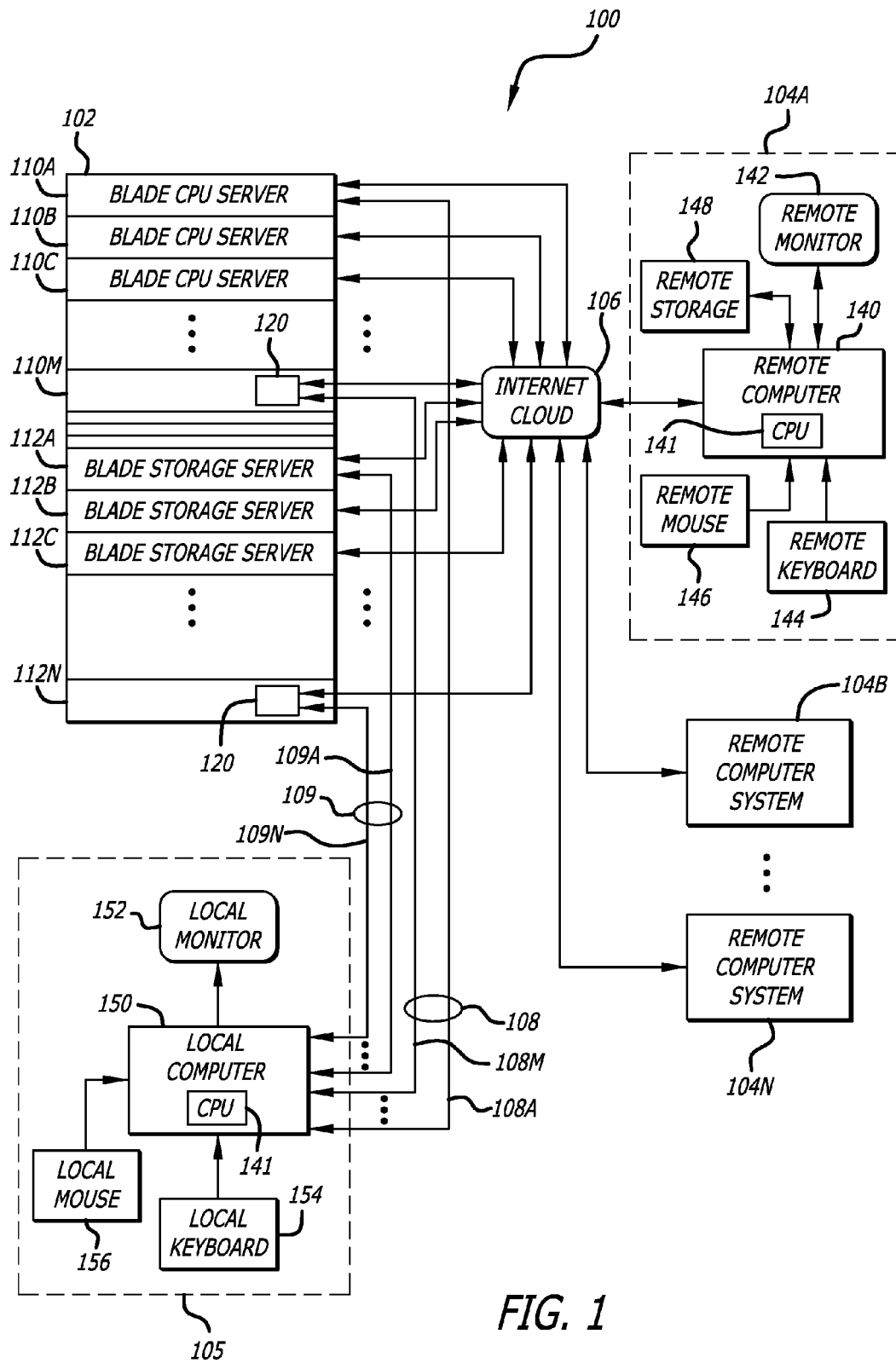
FIGS. 1-3 are block diagrams that illustrate examples of computer systems and computer environments where these computer systems may be used, in accordance with some embodiments.

Referring now to FIG. 1, a server farm system 100 is illustrated with local and remote server management in accordance with one embodiment of the invention. The server farm system 100 includes a server farm 102, one or more remote computer systems 104A-104N at remote locations coupled to the server farm 102 via a local area network (LAN) or a wide area network (WAN) 106, such as the internet, and a local computer system 105 coupled to the server farm 102 via a local communication connection 108,109. The local communication connection 108,109 to the server farm 102 may be a local area network connection (LAN) or a serial communication connection, such as RS232 or universal serial bus (USB).

The server farm 102 may include a plurality of central processing unit (CPU) servers 110A-110M and a plurality of storage servers 112A-112N, each including one or more integrated management, graphics, input/output local/remote controller chips 120. The integrated management, graphics, input/output local/remote controller chip 120 may also be referred to as an integrated intelligent global server management chip. The plurality of central processing unit servers 110A-110M and the plurality of storage servers 112A-112N when having a form factor for mounting into a rack may be referred to as blade CPU servers and blade storage servers, respectively. Collectively, the plurality of central processing unit (CPU) servers 110A-110M and the plurality of storage servers 112A-112N may be simply referred to as a server.

The one or more remote computer systems 104A-104N may each include a remote computer 140 with a CPU 141, a remote monitor 142, a remote keyboard 144, a remote mouse 146, and a remote storage device 148 coupled together as shown. The one or more remote computer systems 104A-104N may be considered to be remote clients to the servers as part of a client-server system. Moreover, one or more of the remote computer systems 104A-104N may be used to provide remote management and control of the servers in the server farm. Server management client software may be executed on one or more of the remote computer systems in order to remotely manage and control the servers in the server farm. Additionally, web browser software may be used to executed by the one or more of the remote computer systems in order to gain access to a web site provided by the integrated intelligent global server management chip 120 and remotely manage and control the servers in the server farm.

The local computer system 105 is co-located with the server farm 102 to locally perform server management. That is, the local computer system 105 is located in the same room as the server farm 102. In contrast, the one or more remote computer systems 104A-104N are at remote locations to remotely perform server management. That is, the one or more remote computer systems 104A-104N are in at least a different room in the same building or otherwise in a different building, city, state, or country than the server farm 102.

Figure 2:
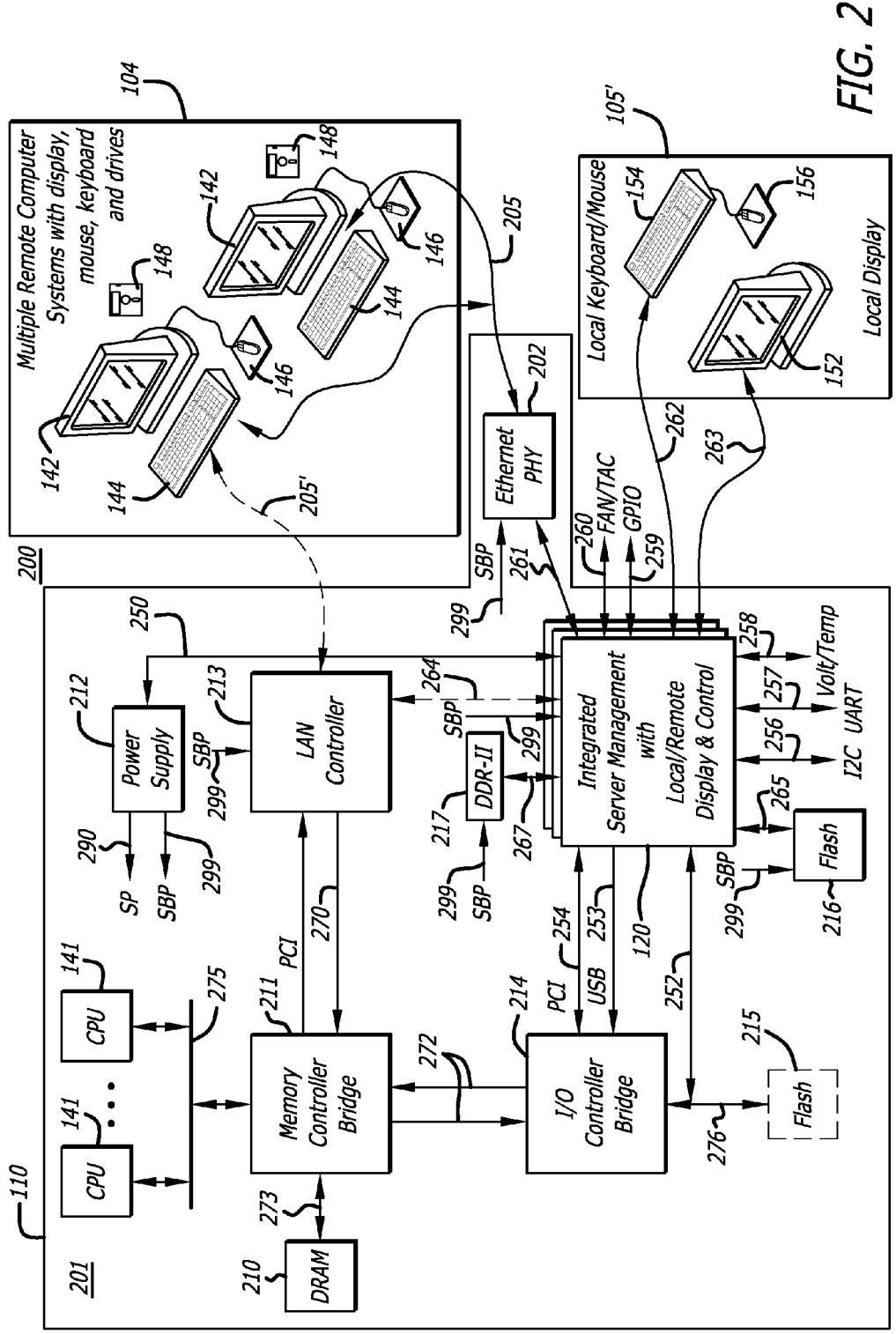

The local computer system 105 may include a local computer 150 with a CPU 141, a local monitor 152, a local keyboard 154, and a local mouse 156 coupled together as shown. In one embodiment of the invention, the local computer system 105 does not include the local computer 150 so that the local monitor 152 couples to a graphics controller in the chip 120 of one of the servers 110,112 and the local keyboard 154 and the local mouse 156 couple to an I/O controller in the chip 120. FIG. 2 illustrates a local keyboard/mouse/display system 105', absent the computer 150 and CPU 141, coupled to an integrated management, graphics, input/output local/remote controller chip 120.

Local server management involves provide server management services in the same room as the server farm 102 with the local computer system. In contrast, remote server management involves providing server management services at a remote location via remote keyboard, video, mouse, & storage (KVMS) at a remote computer system in one embodiment of the invention. Generally, server management services may include monitoring, controlling, maintaining, upgrading, failure resolution, downtime prevention, availability, and performance reporting of the server farm, its servers and the components within each server. The integrated management, graphics, input/output local/remote controller chip 120 facilitates remote server management as well as local server management.

Server Management System

Referring now to FIG. 2, a local/remote server management system 200 is illustrated including a server system 110, one or more remote computer systems 104, and a local keyboard/mouse/display system 105' coupled together as shown. The one or more remote computer systems 104 couple to the server system 110 via a wide area network connection 205. The local keyboard/mouse/display system 105' couples to the server system 110 by one or more serial communication links 262-263, such as RS232, a PS/2, or universal serial bus (USB); a serial over local area network (SOL) communication link, and/or by a direct monitor cable carrying analog/digital red-green-blue (RGB) signals.

The server system 110 includes a printed circuit board 201 with a number of integrated circuits mounted thereto, including one or more integrated management, graphics, input/output local/remote controller chips 120 for one or more processors (CPU) 141, respectively. The server system 110 may include the one or more integrated management, graphics, input/output local/remote controller chips 120; the one or more processors (CPU) 141, scratch pad memory DRAM 210, a memory controller 211, a power supply 212, a local area network interface controller (NIC) 213, a physical network interface device 202, an input/output controller 214, an optional non-volatile flash memory 215, a non-volatile flash memory 216, and a frame buffer memory 217 coupled together as shown in FIG. 2. A number of busses 252-254, 270, 272, 273, 275, 276 may be further used to couple elements of the server system 110 together as shown.

The power supply 212 generates a system power (SP) 290 that is provided to a substantial portion of the server system 110 and a standby power (SBP) 299 that is coupled to the one or more integrated management, graphics, input/output local/remote controller chips 120; the network interface controller 213, the non-volatile flash memory 216; the frame buffer memory 217; and a physical network interface device 202. The system power 290 may be switched on and off by the power supply 212 in response to a power supply (PS) control signal 250. The standby power 299 is generated provided that AC power is provided to the power supply 212. The power supply control signal 250 is generated by an integrated management, graphics, input/output local/remote controller chip 120. A power supply control signal 250 may be generated by each of the integrated management, graphics, input/output local/remote controller chips 120 and the power supply 212 may generate more than one system power that is coupled respectively to the one or more processors 141. In this manner, each processor 141 may be selectively powered down and powered back up by a respective power supply control signal 250. While the processors 141 and other elements of the server system may be selectively powered off, the standby power (SBP) 299 coupled to the one or more integrated management, graphics, input/output local/remote controller chips 120; the network interface controller 213, the non-volatile flash memory 216; the frame buffer memory 217; and a physical network interface device 202 keeps them powered up during such periods.

The flash memory 216 coupled to the one or more integrated management, graphics, input/output local/remote controller chips 120 may store software programs for execution by each. In particular, the flash memory 216 stores the basic input/output system (BIOS) software that is used to initialize the chip 120 and other hardware elements of the server 110. The BIOS also controls the boot process of the server 110 and provides low-level input/output routines to modify details of the system's hardware configuration. The contents of the flash memory 216 can be remotely managed to upgrade or program the firmware that is used by the integrated management, graphics, input/output local/remote controller chip 120 and/or to upgrade or program the firmware that is used by the server 110.

The frame buffer memory 217 coupled to the chips 120 is a random access memory for storage of frames of video or graphics display data that may be displayed locally by the local display 152 and/or remotely by one or more remote displays 142. Thus, the frame buffer memory 217 is shared by the local keyboard/mouse/display system 105' or the local computer system 105 and the remote computer systems 104. While an entire frame of video/graphical data may be stored in the frame buffer memory 217, partitioned tiles of the frame having video/graphics data that has changed from the last frame of data may be transmitted by the chip 120 to the remote computer systems 104 while the entire frame of video/graphical data is provided to the local display 152. Note that a portion of the frame buffer memory 217 is also used as a scratch pad memory by the server management controller 310 for executing program instructions and for data storage.

The physical network interface device 202 may be mounted to the printed circuit board 201. Each of the one or more chips 120 may have a network bus 261 that is coupled to the physical network interface device 202 to couple data onto and receive data from the local or wide area network connection 205.

One or more of the remote computer systems 104 may be clients of the server 110 as well and connect through the wide area network connection 205' instead of or in addition to the wide area connection 205. In this case, the integrated management, graphics, input/output local/remote controller chip 120 may optionally couple to the network interface controller 213 via bus 264 so that the remote computer system 104 that is a client may also provide remote server management.

The client connection over the wide area network connection 205' to the server 110 for data processing is typically faster than the wide area network connection 205 for remote server management. Thus, it is desirable to reduce the amount of data transmitted over the wide area network connection 205 to provide a remote KVM capability for remote server management.

The integrated management, graphics, input/output local/remote controller chip 120 couples to a low pin count (LPC) host interface bus 252, one or more universal serial buses (USB1.1 and USB2.0) 253, one or more PCI buses (PCI/PCI Express) 254 of the server system 110 to transmit and receive ("transceive") data with the I/O controller 214. The integrated management, graphics, input/output local/remote controller chip 120 further couples to six serial inter-integrated circuit ($I^2C$) busses 256, five universal asynchronous receiver transmitter busses 257, analog voltage/temperature monitor lines 258, a general purpose input/output (GPIO) bus 259, and fan control/fan tachometer busses 260.

The integrated management, graphics, input/output local/remote controller chip 120 directly monitors the voltage of the system power 290 and the temperature of the server and perhaps the ambient temperature sensed by sensors by way of the analog voltage/temperature monitor lines 258. The integrated management, graphics, input/output local/remote controller chip 120 controls one or more server fans and monitors their fan speeds by means of the fan control/fan tachometer busses 260 in response to the server temperature and perhaps ambient temperature sensed by sensors. The integrated management, graphics, input/output local/remote controller chip 120 can monitor other server parameters by way of coupling to other sensors and circuits through the six serial inter-integrated circuit ($I^2C$) busses 256. A current sensor coupled to the chip 120 may be used to sense the current being provided by the power supply to the server to provide an indication of power consumption for example. An air flow sensor may also be coupled to the chip 120 to monitor the air flow through the server. A humidity sensor may also be coupled to the chip 120 to monitor the humidity of the surrounding air. A smoke detection sensor may also be coupled to the chip 120 to monitor the surroundings of the server for fire in order to protect the operation of and the data stored in the server.

The integrated management, graphics, input/output local/remote controller chip 120 provides an analog and/or digital video/graphics output to couple to the local display 152 by a video/graphics cable 263. The integrated management, graphics, input/output local/remote controller chip 120 further provides a serial interface, such as a universal serial bus, to couple to the local keyboard 154 and the local mouse 156 by one or more serial cables 262.

Referring now to FIGS. 1 and 2, the integrated management, graphics, input/output local/remote controller chip 120 generally provides integrated server management, graphics control for local and remote video, input/output control, and remote keyboard-mouse control. The integrated management, graphics, input/output local/remote controller chip 120 can provide local and remote server management (baseboard management control) in compliance with the intelligent platform management interface (IPMI) standard as well as other server management standards.

To provide remote keyboard-mouse control, the keystrokes on the remote keyboard 144 are sent to the integrated management, graphics, input/output local/remote controller chip 120 so that they take effect locally at one or more of the servers 110,112. The mouse movement and clicks at the remote mouse 146 are sent to the integrated management, graphics, input/output local/remote controller chip 120 so that they take effect locally at one or more of the servers 110,112.

The integrated management, graphics, input/output local/remote controller chip 120 further provides for remote storage. Data stored in the remote storage device 148 can be written to one or more of the servers 110,112. This allows the remote computer system to remotely install a software operating system or software drivers into the one or more servers 110,112 from the remote storage device. Alternatively, data stored in a local data storage device of the one or more servers may be read out and stored into the remote storage device at the remote computer system. For example, a log file stored in one or more of the servers may be stored in the remote data storage device 148 so that operation of a server may be monitored or debugged.

The integrated management, graphics, input/output local/remote controller chip 120 further provides integrated graphics control so that a single graphics controller can provide local video frames of data to the local monitor 152 and changes in the local video frames of data to one or more of the remote computer systems 104A-104N for display on the remote monitor 142. Oftentimes, only a small portion of a video frame changes from one frame to the next. By sending only the changes in the video frame to the remote computer system, the wide area connection between the server farm 102 and the one or more remote computer systems can be of lower quality slow speed connections, such as an Ethernet 10BASE-T connection or digital subscriber line (DSL) modem.

The integrated management, graphics, input/output local/remote controller chip 120 further provides for remote server management of each of the plurality of central processing unit servers 110A-110M and the plurality of storage servers 112A-112N. This is oftentimes referred to as server management, hardware management, baseboard management control, or intelligent platform management. The integrated management, graphics, input/output local/remote controller chip 120 provides an integrated server management controller (also referred to as an integrated baseboard management controller (BMC)) to monitor system sensors to control the server, such as the system temperature to control the system fans, and other events that may cause system failures. The integrated server management controller of the integrated management, graphics, input/output local/remote controller chip 120 also controls the server power supply to provide the ability to remotely shutdown/restart the system for whatever reason including maintenance or overnight power conservation, for example.

The integrated management, graphics, input/output local/remote controller chip 120 further provides for remote power supply control of each of the plurality of central processing unit servers 110A-110M and the plurality of storage servers 112A-112N. An information technology support person at one of the remote computer systems 104A-104N can remotely signal the integrated management, graphics, input/output local/remote controller chip 120 to switch off the power to one or more of the servers in the server farm 102, but for standby power. An information technology support person at one of the remote computer systems 104A-104N can also remotely signal the integrated management, graphics, input/output local/remote controller chip 120 to switch on the power to one or more of the servers in the server farm 102.

This remote power off and on capability may be useful to reboot an operating system for whatever reason, such as for software upgrades.

Integrated Management, Graphics, Input/Output Local/Remote Controller Chip

Figure 3:
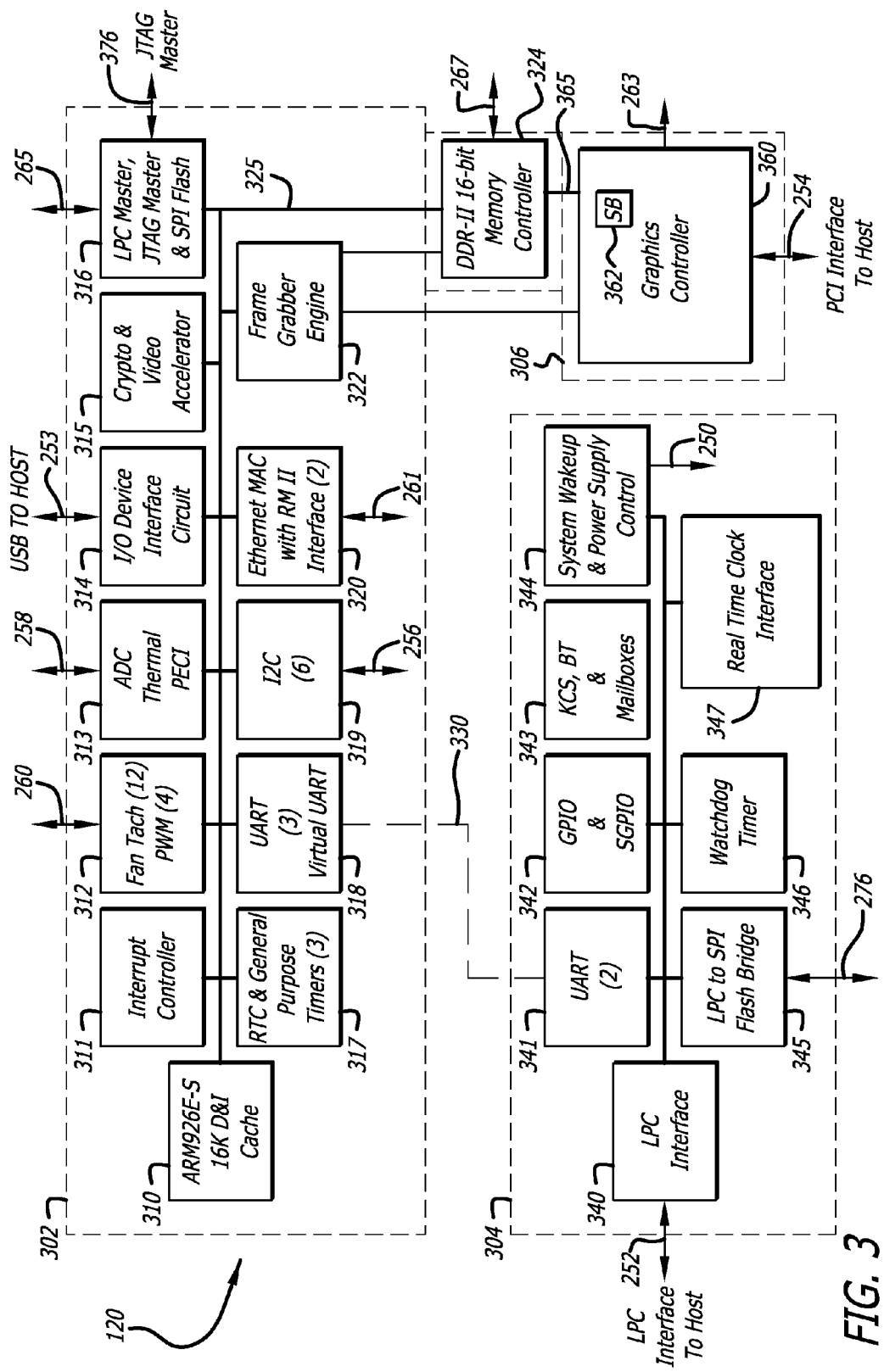

Referring now to FIG. 3, a functional block diagram of the integrated management, graphics, input/output local/remote controller chip 120 is illustrated. The integrated management, graphics, input/output local/remote controller chip 120 is a single monolithic integrated circuit including functional blocks and subsystems in a single semiconductor substrate. That is, the integrated management, graphics, input/output local/remote controller chip 120 provides its functionality in a single chip solution.

The integrated management, graphics, input/output local/remote controller chip 120 includes a server management and remote KVM subsystem 302, a super input/output subsystem 304, and a graphics subsystem 306. The integrated management, graphics, input/output local/remote controller chip 120 includes a memory controller functional block 324 that is shared by the server management & remote KVM subsystem 302 as well as the graphics subsystem 306.

Referring now to FIG. 3 and FIG. 2, the memory controller 324 couples to the frame buffer memory 217 via a memory bus 267. In one embodiment of the invention, the memory 217 is type II DDR dynamic random access memory (DRAM) and the memory controller 324 is a sixteen bit type II DDR memory controller. The shared memory controller 324 allows for the frame buffer memory 217 to readily share its digital data in a digital pixel format with the one or more remote computer systems 104 and the local keyboard/mouse/display system 105' or the local computer system 105. In this manner, the frame buffer memory 217 is a unified memory that can provide support to multiple remote clients in a cost effective way.

The server management & remote KVM subsystem 302 further includes a server management controller 310, including a RISC processor core by Advanced Risc Machines Ltd. (ARM) and memory; an interrupt controller 311, an analog to digital converter 313 for voltage and temperature monitoring; an input/output device interface circuit 314 such as a universal serial bus (USB) interface circuit for USB1.1 and USB2.0; a cryptographer and video accelerator 315; a low pin count (LPC) master, a joint test action group (JTAG) test master, and flash memory serial peripheral interface (SPI) 316; real-time-clock (RTC) and general purpose timers 317; a plurality of universal asynchronous receive transmitters (UARTs) and a virtual UART 318; a plurality of inter-integrated circuit ("i-squared-c") interfaces 319; at least two Ethernet media access controllers 320 with a media independent interface (RMII) to couple to the physical (PHY) interface 202; and a frame grabber engine 322.

The server management controller 310 is a micro-controller that is programmed by its memory to provide baseboard management control. Thus, the server management controller 310 may also be referred to as a baseboard management controller. The server management controller 310 monitors the system temperature and controls the system fans. The server management controller 310 further monitors other events that may cause server system failures. The server management controller 310 further controls a system wakeup and power supply controller 344 to generate the power supply control signal 250 so that the server system can be substantially shutdown and restarted.

The frame grabber engine 322 couples to the memory controller 324 and the shared graphics controller 360 of the graphics subsystem 306. The frame grabber engine 322 may be used to partition a frame into tiles of data within the frame. The frame grabber engine 322 may be used to determine what tiles of a current frame have video/graphics data that has changed from the last frame. The identified changed tiles within a frame of data may then be compressed, packetized, and transmitted by the chip 120 to the remote computer systems 104 by way of the wide area network.

With a plurality of media access controllers 320, multiple clients at one or more remote computer systems 104 may connect simultaneously and view and manage one or more server systems 110 over a wide area network. Additionally, the Ethernet media access controllers 320 provide the remote connection for the remote computer systems 104 to the server management & remote KVM subsystem 302 and its elements. Key strokes and mouse movements/clicks are sent as packets from the remote computer system over the network to the Ethernet media access controller 320. The server management controller 310 processes these packets and presents key strokes and mouse movements/clicks to bus controller 314 and the host CPU via the USB interface 253 as though they were USB based keyboard/mouse commands. Remote storage devices 148 may also be presented by the bus controller 314 to the host CPU via the USB interface 253 as being USB based storage devices. The remote computer systems 104 can remotely install an operating system or drivers from the remote storage device 148 into the hard disk storage or any non-volatile storage 216 of the server by means of the Ethernet media access controller 320 and flash SPI interface 316. Additionally, the server management & remote KVM subsystem 302 and the media access controllers 320 allow a local audio stream on a universal serial bus from a microphone to be communicated to a remote client over the wide area network. Each of the media access controllers 320 may also be referred to as a network interface.

The super I/O subsystem 304 integrates together a number of communication interfaces of the server including a local USB keyboard and mouse interface for a local USB keyboard and USB mouse, and an RS232 communications interface via one or more universal asynchronous receiver transmitters for a local computer 105. The super I/O subsystem 304 provides a plurality of general purpose input/output ports and a bridge to the Basic Input/Output System (BIOS) stored in the flash memory 216. Moreover, the super I/O subsystem 304 provides an interface with the server management controller 310 of the server management & remote KVM subsystem 302. The super I/O subsystem 304 may also interface with the server management & remote KVM subsystem 302 to transparently send communications over a UART to a remote computer system 104 through the network media access controller 320 by way of the wide area network connection 261, 205.

The super I/O subsystem 304 includes a low pin count (LPC) interface 340; a plurality of universal asynchronous receive transmitters (UARTs) 341; general purpose input/output (GPIO) and serial general purpose input/output (SGPIO) interfaces 342; keyboard style interface controller (KCS), block transfer (BT) & mailbox controller 342; a system wakeup and power supply controller 344; an LPC to flash memory serial peripheral interface (SPI) bridge 345 to couple to one or more SPI flash memory devices 216; a watchdog timer 346; and a real time clock (RTC) interface 347 coupled together as shown in FIG. 3. One of the UARTs 341 of the super I/O subsystem 304 may be selectively coupled to the virtual UART 318 of the BMC & KVMS subsystem 302 by means of a selective serial communication connection 330 so that the host system may communicate using a serial communication protocol with one of the remote computer systems 104.

The system wakeup and power supply controller 344 generates the power supply control signal 250 to provide the capability to remotely shutdown/restart the system.

As mentioned previously, the graphics subsystem 306 further includes the shared graphics controller 360 that is coupled to the memory controller 324 and the frame grabber engine 322. The graphics controller 360 further interfaces to the PCI/PCI express bus 254 to couple to the one or more host processors 141 and read and write into the memory 210 in order to obtain a frame of video/graphics data for display.

Generally, the graphics subsystem 306 provides the graphics controller 360 so that frames of video/graphical data may be displayed on the local monitor 152 via the video/graphics output 263. However when remote server management is taking place at a remote computer 104, it may be desirable to turn off the local display 152 for security reasons as well as to save memory bandwidth used by the graphics controller 360 for the local display. The graphics controller includes a security bit (SB) 362 that may be set by a support person at a remote computer system 104 over the wide area network connection 205. In response to the security bit 362, the graphics controller 360 turns off the video/graphics output 263 to the local display 152. Additionally, the graphics controller 360 avoids reading data from the frame buffer memory 217 such that data traffic on the bus 365 and bus 267 is reduced thereby conserving memory bandwidth and power.

Cursor Positioning

Controlling cursor position may involve many different factors. These factors may include the speed that a cursor control device is moved, the sensitivity of the cursor control device in response to the speed that it is moved, the operations performed by an OS in response to the speed that the cursor control device is moved, etc. When the cursor control device is used to control the cursor position of a local display, a user may easily manipulate the cursor control device based on visual feedback. However, the visual feedback ability may not be available when a remote user is controlling the position of a cursor of a local display. As such, there is a need for feedback logic to enable the cursor to be positioned at a location intended by the remote user.

Figure 4A:
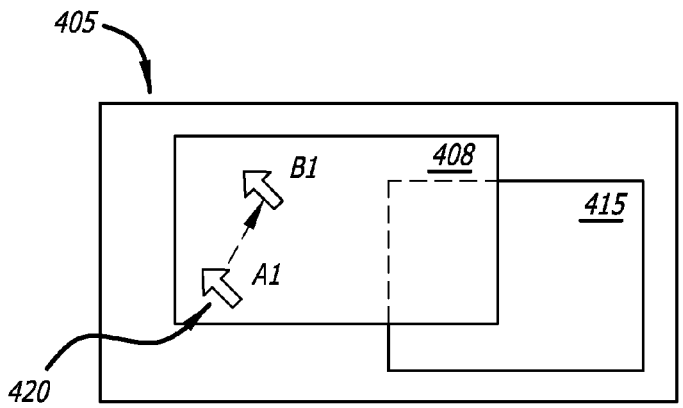
FIG. 4A illustrates one example of movement of a cursor associated with a remote display, in accordance with some embodiments.
Figure 4B:
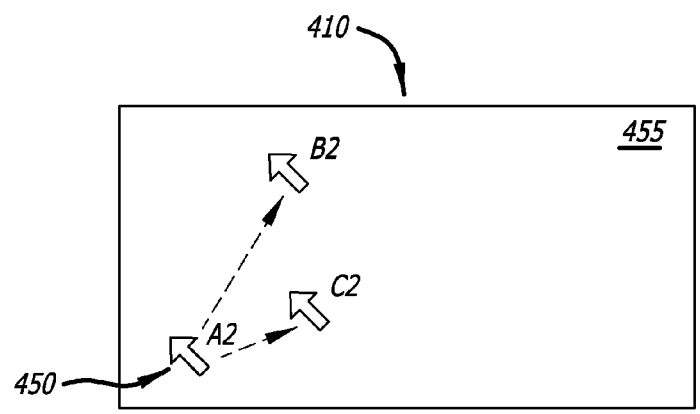
FIG. 4B illustrates one example of movement of a cursor associated with a local display in response to the movement of the cursor associated with the remote display, in accordance with some embodiments.

FIG. 4A illustrates one example of movement of a cursor associated with a remote display, in accordance with some embodiments. FIG. 4B illustrates one example of movement of a cursor associated with a local display in response to the movement of the cursor associated with the remote display, in accordance with some embodiments. The examples in FIGS. 4A-4B may apply to computing environments where a user may use remote display 405 from a remote location to manage computing operations and/or resources as if the user was using the local display 410. Although not shown, the remote display 405 may be associated with a remote computer system, and the local display 410 may be associated with a local computer system. A communication link may be used to enable the remote computer system to communicate with the local computer system. The communication link may be associated with a wide area network (WAN), a local area network (LAN), a point-to-point connection, etc. The communication link may have limited bandwidth.

For some embodiments, the remote computer system and the local computer system may be implemented with an operating system (OS) that may enable applications to execute in environments that accept input from a keyboard, a mouse, a track ball, or any input device that may be associated with controlling movement of a cursor. Each of these devices may be referred to as a cursor control device. The OS may support applications executing in windows (e.g., Microsoft Windows OS from Microsoft Corporation in Redmond, Wash.).

One of the issues associated with using an OS that supports applications executing in windows is that when the remote cursor 420 associated with the remote display 405 is moved, it is moved relative to the remote display 405. When the cursor movement information associated with the remote cursor 420 is sent from the remote computer system to the local computer system, the cursor movement information may be used to move the local cursor 450 associated with the local display 410. As illustrated in FIGS. 4A-4B, the remote cursor 420 is positioned within window 408 of the remote display 405 which is smaller than the window 455 of the local display 410 that includes the local cursor 450. As such, the same movement performed by the OS of the local computer system may place the local cursor 450 at an incorrect position within the window 455 of the local display 410. Furthermore, the resolutions of the remote display 405 and of the local display 410 may be different. For example, the resolution of the local display 410 may be 1280 pixels by 1024 pixels, and the resolution of the remote display 405 may only be 1024 pixels by 768 pixels. As such, the positions of the two cursors 420 and 450 may not be consistent with one another. While the cursor movement information may include coordinate information of the remote cursor, the cursor movement information may further include size of a window and the resolution of a display associated with the remote cursor.

Another issue is the speed associated with the movement (acceleration setting) of the remote cursor 420 associated with the remote display 405. The OS associated with the local computer system may not have any knowledge about how fast the remote cursor 420 is moved. Thus, when the local cursor 450 is moved by the OS at a fast speed, it may be moved from the cursor position A2 to the cursor position B2. However, if the local cursor 450 is moved by the OS at a moderate speed, it may be moved from the cursor position A2 to the cursor position C2, even though both movements may be in the same horizontal and vertical directions as the directions associated with the movement of the remote cursor 420. Accordingly, the cursor movement information of the remote cursor may further include the acceleration setting of the cursor and the direction of cursor movement from one cursor position to another.

Feedback Subsystem

Figure 5:
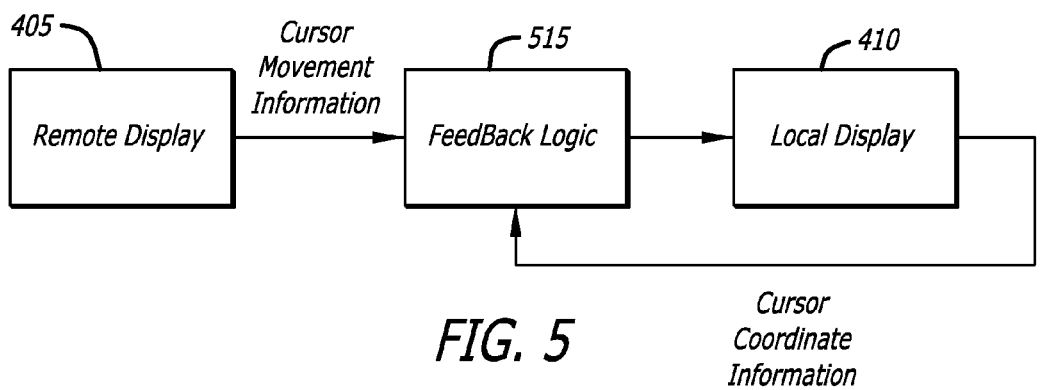
FIG. 5 is a block diagram that illustrates an example of a technique that may be used to remotely control movement of a cursor of a local display, in accordance with some embodiments.

FIG. 5 is a block diagram that illustrates an example of a technique that may be used to remotely control movement of a cursor of a local display 410, in accordance with some embodiments. In this example, the remote cursor movement information (e.g., when moving from cursor position A1 to cursor position B1) associated with the remote display 405 may be sent from the remote computer system to the local computer system, such as a server. The cursor movement information may be received by feedback logic 515 of the local computer system. The feedback logic 515 may store coordinate information of the cursor position B1, such as illustrated in FIG. 4A for example.

The remote cursor movement information may be received by the local computer system as it was input from a locally connected cursor control device. The remote cursor movement information may then be processed by the OS associated with the local computer system. The OS may use the remote cursor movement information to determine local cursor coordinate information of the local cursor 450 of the local display 410. Local cursor coordinate information of the local cursor 450 may then be accessed by the feedback logic 515. The feedback logic 515 may compare the local cursor coordinate information of the local cursor 450 with the stored remote cursor coordinate information of the remote cursor 420, such as at cursor position B1, to determine if they are consistent with each other. If the information is not consistent, the feedback logic 415 may issue commands to cause the OS to readjust the position of the local cursor 450.

The feedback logic 415 may enable the local cursor 450 to be correctly positioned, and therefore may have an effect on the next action that the local computer system may perform. For example, when the local cursor 450 is correctly placed at a position (x, y), the local computer system may perform some operations. When the local cursor 450 is incorrectly placed at a position (x1, y1), the local computer system may not perform any operations.

Feedback Implementation

Figure 6:
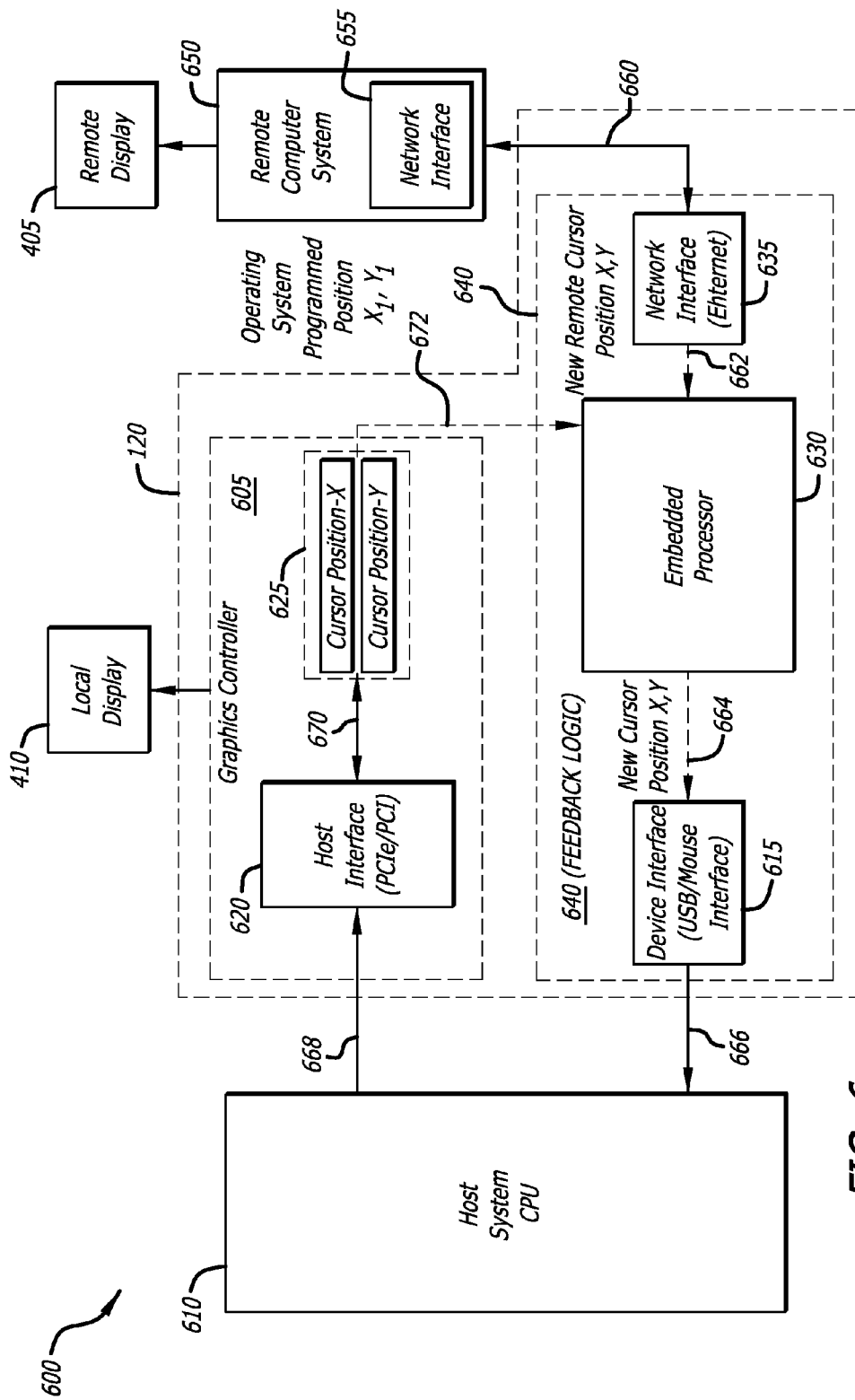
FIG. 6 is a system block diagram that illustrates one implementation of a feedback logic that may be used to control cursor position of a local display and perform remote hardware cursor snooping in accordance with some embodiments.

FIG. 6 is a system block diagram that illustrates one implementation of a feedback logic that may be used to control cursor position of a local display, in accordance with some embodiments. Feedback logic 640 may be coupled to a local computer system 600. The feedback logic 640 may include network interface 635, an embedded controller 630, and a device interface 615. The device interface 615 may be coupled to an input port of the local computer system 600 via link 666. The server system 600 may include a host processor 610 and the integrated server management chip 120 with a graphics controller 605, and the feedback logic. A local display 410 may couple to the graphics controller to display information. The graphics controller 605 may include a host interface 620 and one or more cursor registers 625. The one or more cursor registers 625 may be used to store cursor coordinate information associated with a cursor of the local display 410. One cursor register may store cursor position X information and another cursor register may store cursor position Y information.

For some embodiments, the feedback logic 640 may be implemented as an integrated circuit (IC) 120. The IC may be mounted onto a board in the server system 600.

When the user moves the cursor 420 of the remote display 405 associated with remote computer system 650, cursor movement information from that action may be sent to communication link 660 via network interface 655. The cursor movement information may be a new remote cursor position with X,Y coordinates. The cursor movement information may be received by the feedback logic 640 via network interface 635. The cursor movement information may then be sent to the embedded processor 630 via link 662 and processed by the embedded processor 630. Coordinate information of the cursor 420 may also be received and stored by the embedded processor 630.

The embedded processor 630 may then send the cursor movement information to the host system 610 via link 664, device interface 615, link 666, and an input/output (I/O) interface of the host system 610. The I/O interface of the host system 610 and the device interface 615 may be universal serial bus (USB) interfaces but may generally be referred to as cursor movement control interfaces. The host system 610 may receive the cursor movement information as if the information is associated with a local cursor control device, even though it may be associated with a remote cursor control device.

The operating system of the host system or processor 610 may process the cursor movement information and determine new coordinate information for the cursor 450. Responsive to the acceleration settings for the cursor, the host operating system computes new $X_1$, $Y_1$ cursor position information. The host operating system may program the graphic controller registers 625 with the new cursor-position X and the new cursor-position Y. The OS may then issue requests to move the cursor 450. The requests may alternatively include the new coordinate information for the cursor 450. The OS may send the requests to the graphics controller 605 via link 668. This may be performed by programming one or more cursor registers 625 of the graphics controller 605 via link 670. The one or more cursor registers of the graphics controller 605 may be part of a memory of the local computer system 600. The cursor 450 may then be moved to a position in response to the new coordinate information stored in the one or more cursor registers. It may be noted that the new coordinate information may be sent by the graphics controller 605 to a memory controller of the local computer system 600. This new coordinate information may be intercepted or captured and then stored. This stored new coordinate information may be used by the feedback logic 640 via link 672.

For some embodiments, the embedded processor 630 may access the new coordinate information of the cursor 450. The embedded processor 630 reads the programmed cursor position $X_1$ and $Y_1$. The embedded processor 630 compares the new coordinate information of the cursor 450 with the stored coordinate information of the cursor 420 to determine if the cursor 450 is positioned where it is intended. The embedded processor 630 compares the programmed cursor position $X_1$ and $Y_1$ with the remote cursor position X and Y. If the cursor is not where it was intended to be, the embedded processor 630 may repetitively send the cursor movement information to the host system 610 to move the cursor 450. If the programmed cursor position $X_1$ and $Y_1$ is not as requested by the remote system then the embedded processor 630 sends the remote cursor position information X,Y to the host 610 once again The embedded processor 630 may continue to send the remote cursor position information X,Y to the host 610 so that the host operating system moves the cursor 450 until the cursor position substantially matches the requested cursor position.

There may be a delay between when the cursor 420 is moved and when the associated cursor movement information is received by the local computer system 600. By the time the cursor movement information is received by the feedback logic 640, the cursor 420 may already be at a different position. This delay may allow the embedded processor 630 sufficient time to repeatedly cause the local computer system 600 to move the cursor 450 to the right position.

Process

Figure 7:
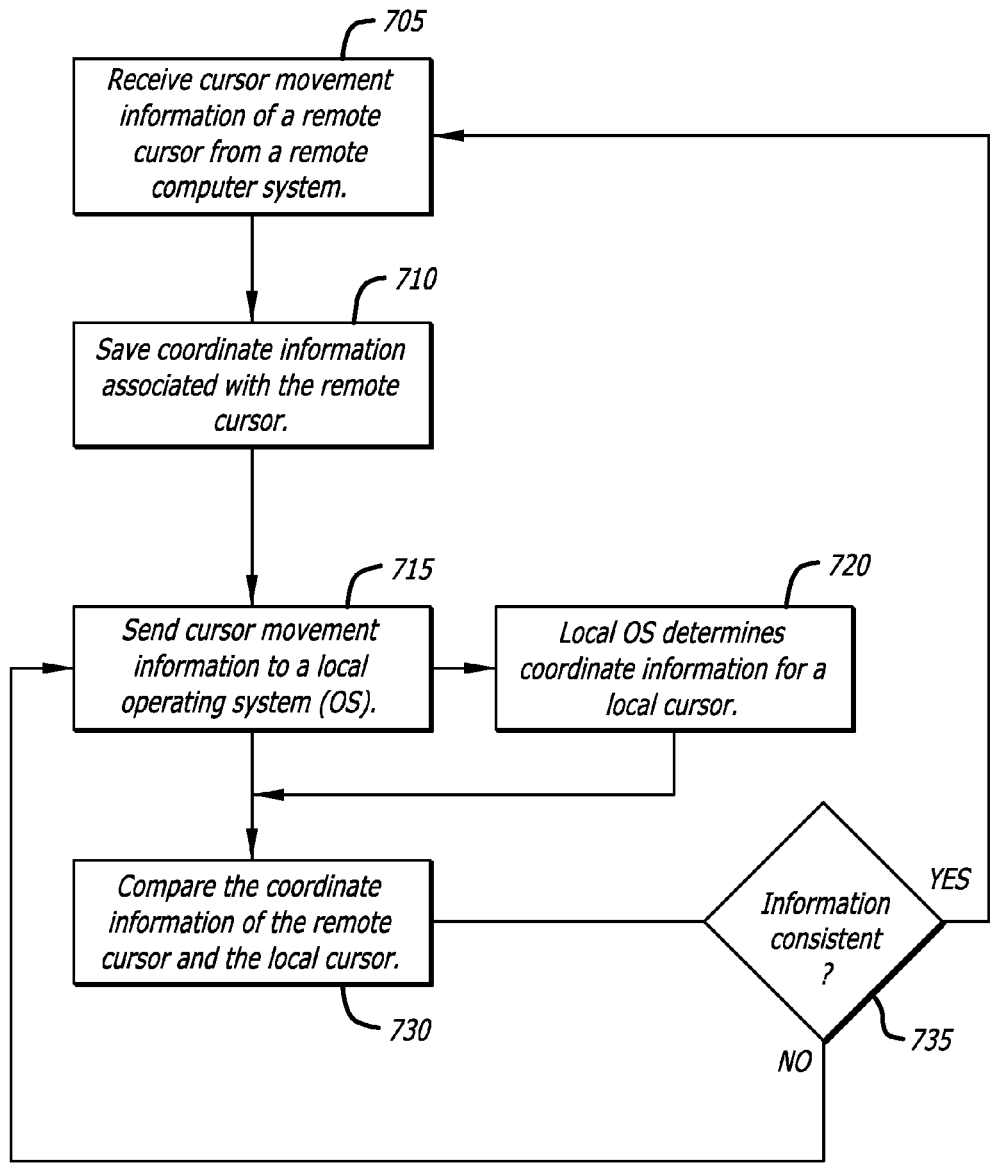
FIG. 7 illustrates one example of a process that may be performed to control a cursor position, in accordance with some embodiments.

FIG. 7 illustrates one example of a process that may be performed to control a cursor position, in accordance with some embodiments. The process in this example may be performed using feedback logic. The feedback logic may be implemented using software, hardware or a combination of both software and hardware.

At block 705, cursor movement information associated with movement of a remote cursor is received by the feedback logic via a communication link. The feedback logic may be located locally and may be part of a local server system. Cursor coordinate information associated with the remote cursor may also be received and stored by the feedback logic, as shown in block 710.

At block 715, the cursor movement information is sent to an OS of the local server system. The OS may use the cursor movement information to determine cursor coordinate information associated with a local cursor, as shown in block 720.

At block 730, the feedback logic may compare the cursor coordinate information associated with the remote cursor and with the local cursor. If the information is not consistent with each other, the feedback logic may again send the cursor movement information to the OS, as shown in block 735. This may continue until the local cursor is placed in a position that the feedback logic determines that the position is as intended. However, if the information is consistent with each other, the feedback logic may continue to monitor for new cursor movement information from the remote computer system. The process illustrated in FIG. 7 may continue until the communication link between the feedback logic and the remote computer system is disconnected or until a user at the remote computer system ends the communication session with the feedback logic.

Computer Readable Media

The operations of the various methods of the present invention may be implemented by a processing unit in a digital processing system, which executes sequences of computer program instructions. The feedback logic 640 may be implemented in software, in hardware or in a combination of both software and hardware. For example, the feedback logic 640 may be implemented as a chip or chipset with hardware circuitry that includes the embedded processor 630 dedicated to performing functions of causing the local cursor to be placed in a correction position. The chip or chip set may further include internal memory and bus connections to the local computer system.

As another example, the feedback logic 640 may be implemented in software and may include instructions that are stored in a memory which may be considered to be a machine readable storage media. The memory may be random access memory, read only memory, a persistent storage memory, such as mass storage device or any combination of these devices. Execution of the sequences of instruction may cause the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the CPU (e.g., system processor).

In other cases, the instructions may not be performed directly or they may not be directly executable by the CPU. Under these circumstances, the executions may be executed by causing the CPU to execute an interpreter that interprets the instructions, or by causing the CPU to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software or to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. As an example, the embedded processor. Accordingly, the specification and drawings are to be regarded in an illustrative rather than a restrictive sense.

What is claimed is:

1. A method comprising:
    controlling a graphics controller of an apparatus, that is coupled to a host processor of the apparatus, to program at least one cursor register to position a first cursor of the apparatus in response to first coordinate information for the first cursor determined by the apparatus based on remote cursor movement information received by the host processor from a remote computer system that remotely controls the apparatus, the remote cursor movement information being associated with a second cursor of the remote computer system,
    controlling a feedback subsystem, that is coupled to the host processor to:
        receive second coordinate information for the second cursor and the remote cursor movement information for the second cursor from the remote computer system,
        send the remote cursor movement information to the host processor,
        read the first coordinate information for the first cursor from the at least one cursor register of the graphics controller of the apparatus,
        compare the first coordinate information for the first cursor with the second coordinate information for the second cursor to determine whether the first cursor is substantially placed at a correct position, and
        in a case where the feedback subsystem determines that the first cursor is not substantially placed at a correct position, resend the remote cursor movement information for the second cursor to the host processor of the apparatus via a device interface of the apparatus to cause the host processor to readjust the position of the first cursor, the host processor repositioning the first cursor based on the remote cursor movement information resent by the feedback subsystem,
    wherein the apparatus synchronizes a position at which the first cursor is displayed by a display of the apparatus with a position at which the second cursor is displayed by a display of the remote computer system, and
    wherein the apparatus is remotely controlled by the remote computer system.

2. The method of claim 1, wherein
the feedback subsystem includes
    a network interface to receive the remote cursor movement information,
    an embedded processor coupled to the network interface to process the remote cursor movement information, and
    the device interface, the device interface being coupled to the embedded processor and being constructed to send the remote cursor movement information to an input interface coupled to the embedded processor,
the network interface is coupled between the embedded processor of the feedback subsystem and the remote computer system,
the device interface is coupled between the embedded processor of the feedback subsystem and the host processor,
the embedded processor of the feedback subsystem receives the remote cursor movement information from the remote computer system via the network interface.

3. The method of claim 2, wherein
the device interface sends the remote cursor movement information from the embedded processor of the feedback subsystem to the host processor via a universal serial bus (USB).

4. The method of claim 2, wherein
an operating system (OS) in the apparatus is to send a request to the graphics controller, and
the request is to change position of the first cursor in response to the remote cursor movement information, and
the request sent to the graphics controller includes the first coordinate information of the first cursor.

5. The method of claim 4, wherein
the remote cursor movement information associated with the second cursor is received by the feedback subsystem from the remote computer system via a communication link.

6. The method of claim 5, wherein
the communication link is a limited bandwidth communication link.

7. The method of claim 5, wherein
the remote cursor movement information is generated when the second cursor is moved from a first position to a second position, and
the first cursor is to be moved in response to movement of the second cursor.

8. An apparatus comprising:
a host processor;
a graphics controller coupled to the host processor and constructed to program at least one cursor register to position a first cursor of the apparatus in response to first coordinate information for the first cursor determined by the apparatus based on remote cursor movement information received by the host processor from a remote computer system that remotely controls the apparatus, the remote cursor movement information being associated with a second cursor of the remote computer system; and
a feedback subsystem coupled to the host processor, the feedback subsystem constructed to:
receive second coordinate information for the second cursor and the remote cursor movement information for the second cursor from the remote computer system,
send the remote cursor movement information to the host processor,
read the first coordinate information for the first cursor from the at least one cursor register of the graphics controller of the apparatus,
compare the first coordinate information for the first cursor with second coordinate information for the second cursor to determine whether the first cursor is substantially placed at a correct position, and
in a case where the feedback subsystem determines that the first cursor is not substantially placed at a correct position, resend the remote cursor movement information for the second cursor to the host processor of the apparatus via a device interface of the apparatus to cause the host processor to readjust the position of the first cursor, the host processor repositioning the first cursor based on the remote cursor movement information resent by the feedback subsystem,
wherein the apparatus synchronizes a position at which the first cursor is displayed by a display of the apparatus with a position at which the second cursor is displayed by a display of the remote computer system, and
wherein the apparatus is remotely controlled by the remote computer system, and
wherein the feedback subsystem includes:
a network interface to receive the remote cursor movement information,
an embedded processor coupled to the network interface to process the remote cursor movement information, and
the device interface, the device interface being coupled to the embedded processor and being constructed to send the remote cursor movement information to an input interface coupled to the embedded processor.

9. The apparatus of claim 8, wherein
the network interface is coupled between the embedded processor of the feedback subsystem and the remote computer system,
the device interface is coupled between the embedded processor of the feedback subsystem and the host processor,
the embedded processor of the feedback subsystem receives the remote cursor movement information from the remote computer system via the network interface, and
the device interface sends the remote cursor movement information from the embedded processor of the feedback subsystem to the host processor via a universal serial bus (USB).

10. The apparatus of claim 9, wherein
an operating system (OS) of the host processor is to send the first coordinate information of the first cursor to the graphics controller in response to the remote cursor movement information.

11. A system comprising:
a host processor;
a graphics controller coupled to the host processor and constructed to program at least one cursor register to position a first cursor of the system in response to first coordinate information for the first cursor determined by the system based on remote cursor movement information received by the host processor from a remote computer system that remotely controls the system, the remote cursor movement information being associated with a second cursor of the remote computer system; and
a feedback subsystem coupled to the host processor, the feedback subsystem constructed to:
receive second coordinate information for the second cursor and the remote cursor movement information for the second cursor from the remote computer system,
send the remote cursor movement information to the host processor,
read the first coordinate information for the first cursor from the at least one cursor register of the graphics controller of the system,
compare the first coordinate information for the first cursor with the second coordinate information for the second cursor to determine whether the first cursor is substantially placed at a correct position, and
in a case where the feedback subsystem determines that the first cursor is not substantially placed at a correct position, resend the remote cursor movement information for the second cursor to the host processor of the system via a device interface of the system to cause the host processor to readjust the position of the first cursor, the host processor repositioning the first cursor based on the remote cursor movement information resent by the feedback subsystem,
wherein the system synchronizes a position at which the first cursor is displayed by a display of the system with a position at which the second cursor is displayed by a display of the remote computer system, and
wherein the system is remotely controlled by the remote computer system.

12. The system of claim 11, wherein
the feedback subsystem includes
a network interface to receive the remote cursor movement information,
an embedded processor coupled to the network interface to process the remote cursor movement information, and a device interface coupled to the embedded processor to send the remote cursor movement information to an input interface coupled to the embedded processor, the network interface is coupled between the embedded processor of the feedback subsystem and the remote computer system, the device interface is coupled between the embedded processor of the feedback subsystem and the host processor, the embedded processor of the feedback subsystem receives the remote cursor movement information from the remote computer system via the network interface, and the device interface sends the remote cursor movement information from the embedded processor of the feedback subsystem to the host processor via a universal serial bus (USB).

13. The system of claim 12, wherein
the feedback subsystem is configured to store the second coordinate information associated with the second cursor.

14. The system of claim 13, wherein
the embedded processor compares the second coordinate information associated with the second cursor and the first coordinate information associated with the first cursor to determine when the first cursor is substantially placed at the correct position.

15. The system of claim 11, wherein the first coordinate information indicates a position of the first cursor, and the second coordinate information indicates a position of the second cursor.

16. The system of claim 15, wherein the first cursor is positioned within a first window and the second cursor is positioned within a second window, the first window having a size that is different than a size of the second window.

17. The system of claim 15, wherein the display of the system has a resolution that is different than a resolution of the display of the remote computer system.

18. The system of claim 15,
wherein the first coordinate information read by the feedback subsystem from the at least one cursor register indicates an X-axis cursor position and a Y-axis cursor position at which the first cursor is displayed by the display of the system, wherein the second coordination information received by the feedback subsystem from the remote computer system indicates an X-axis cursor position and a Y-axis cursor position at which the second cursor is displayed by the display of the remote computer system, wherein the feedback subsystem determines whether the X-axis cursor position and the Y-axis cursor position at which the first cursor is displayed are the same as the X-axis cursor position and the Y-axis cursor position at which the second cursor is displayed, and wherein in a case where the feedback subsystem determines that the X-axis cursor position and the Y-axis cursor position at which the first cursor is displayed are not the same as the X-axis cursor position and the Y-axis cursor position at which the second cursor is displayed, the feedback subsystem resends the remote cursor movement information for the second cursor to the host processor of the system to cause the host processor to readjust the position of the first cursor.

19. The system of claim 18, wherein in a case where the first cursor is substantially placed at the correct position, the host processor performs an operation that corresponds to placement of the first cursor on the correct position, and wherein in a case where the first cursor is not substantially placed at the correct position, the host processor does not perform the operation that corresponds to placement of the first cursor on the correct position.

20. The system of claim 19, wherein the system is a server system, the graphics controller and the feedback subsystem are integrated together in an intelligent server management chip coupled to the host processor via at least one bus of the server system and in the case where the feedback subsystem of the system determines that the first cursor is not substantially placed at a correct position, the feedback subsystem resends the remote cursor movement information to the host processor of the system via the at least one bus of the server system.

* * * * *